US010757670B2

(12) United States Patent
Hietalahti

(10) Patent No.: US 10,757,670 B2
(45) Date of Patent: Aug. 25, 2020

(54) METHOD AND APPARATUS FOR ROAMING RESTRICTIONS OF FORBIDDEN RADIO ACCESS NETWORKS IN A WIRELESS SYSTEM

(75) Inventor: Hannu Petri Hietalahti, Kiviniemi (FI)

(73) Assignee: Nokia Technologies Oy, Espoo (FI)

( * ) Notice: Subject to any disclaimer, the term of this patent is extended or adjusted under 35 U.S.C. 154(b) by 105 days.

(21) Appl. No.: 14/110,020

(22) PCT Filed: Apr. 14, 2011

(86) PCT No.: PCT/IB2011/051629
§ 371 (c)(1),
(2), (4) Date: Oct. 4, 2013

(87) PCT Pub. No.: WO2012/140475
PCT Pub. Date: Oct. 18, 2012

(65) Prior Publication Data
US 2014/0038592 A1    Feb. 6, 2014

(51) Int. Cl.
*H04W 60/04*   (2009.01)
*H04W 48/18*   (2009.01)

(52) U.S. Cl.
CPC ............ *H04W 60/04* (2013.01); *H04W 48/18* (2013.01)

(58) Field of Classification Search
CPC ..... H04W 92/02; H04W 48/18; H04W 48/02; H04W 36/24; H04W 36/16; H04W 60/00; H04W 60/04
(Continued)

(56) References Cited

U.S. PATENT DOCUMENTS 7,181,212 B2 *   2/2007   Hogan ................. H04W 60/00
                                                      455/434
7,702,329 B1 *   4/2010   Durig ................... H04W 8/183
                                                     455/432.1
(Continued)

FOREIGN PATENT DOCUMENTS

EP    1286560    2/2003
EP    2146541    1/2010
(Continued)

OTHER PUBLICATIONS

International Search Report and Written Opinion for corresponding Patent Cooperation Treaty Application No. PCT/IB2011/051629, dated Jan. 9, 2012, 12 pages.
(Continued)

*Primary Examiner* — Julio R Perez
(74) *Attorney, Agent, or Firm* — Mintz Levin Cohn Ferris Glovsky and Popeo, P.C.

(57) ABSTRACT

In accordance with an example embodiment of the present invention, an apparatus comprising: at least one processor; and at least one memory including computer program code, wherein the at least one memory and the computer program code are configured to, with the at least one processor, cause the apparatus to perform at least the following: receive at least one of forbidden radio access technology code and indication that a radio access technology of a cell is forbidden, wherein the at least one of forbidden radio access technology code and indication indicates a radio access technology not allowed for access; store the received at least one of forbidden radio access technology code and indication in a forbidden list; and perform an attach, tracking area update or routing area update in a suitable cell if a suitable cell can be found within the same network not using the radio access technologies in the forbidden list; or perform a
(Continued)

network re-selection if a suitable cell cannot be found within the same network.

18 Claims, 3 Drawing Sheets

(58) Field of Classification Search
USPC ... 455/435.2, 435.3, 436, 443, 432.1, 432.2, 455/435.1
See application file for complete search history.

(56) References Cited

U.S. PATENT DOCUMENTS

| | | | | |
|---|---|---|---|---|
| 8,681,702 | B2* | 3/2014 | Tiwari | H04W 48/18 370/328 |
| 8,818,449 | B2* | 8/2014 | Buckley | H04W 48/12 370/338 |
| 2003/0040313 | A1* | 2/2003 | Hogan et al. | 455/435 |
| 2005/0227720 | A1* | 10/2005 | Gunaratnam | H04W 48/18 455/510 |
| 2005/0282544 | A1* | 12/2005 | Oommen | H04W 8/183 455/432.1 |
| 2005/0288016 | A1* | 12/2005 | Kuchibhotla | H04W 48/04 455/435.2 |
| 2007/0287419 | A1* | 12/2007 | Wang | H04W 60/00 455/411 |
| 2008/0096607 | A1* | 4/2008 | Lee | H04W 60/00 455/558 |
| 2009/0196265 | A1* | 8/2009 | Mariblanca Nieves | H04W 8/065 370/338 |
| 2010/0075658 | A1* | 3/2010 | Hou et al. | 455/422.1 |
| 2010/0216465 | A1* | 8/2010 | Mubarek | H04W 48/18 455/435.1 |
| 2010/0323663 | A1* | 12/2010 | Vikberg | H04J 11/0093 455/410 |

FOREIGN PATENT DOCUMENTS

| | | |
|---|---|---|
| EP | 2282586 | 2/2011 |
| GB | 2428540 | 1/2007 |
| WO | WO 0105169 A2 * | 7/1999 |
| WO | 2007020515 | 2/2007 |
| WO | WO 2010049573 A1 * | 10/2010 |

OTHER PUBLICATIONS

"3rd Generation Partnership Project; Technical Specification Group Core Network and Terminals; Non-Access-Stratum (NAS) functions related to Mobile Station (MS) in idle mode (Release 10)", 3GPP Standard; 3GPP TS 23.122, 3rd Generation Partnership Project (3GPP), Mobile Competence Centre,; 650 Route Des Lucioles; F-06921 Sophia-Antipolis Cedex; rfrance, No. V10.3.0, Apr. 1, 2011, pp. 1-43.

3GPP, "Technical Specification Group Core Network and Terminals; Evolved Packet System (EPS); Mobility Management Entity (MME) and Serving GPRS Support Node (SGSN) related interfaces based on Diameter protocol", 3rd Generation Partnership Project, 3GPP TS 29.272 V8.1.1, Jan. 2009.

3GPP, "Technical Specification Group Core Network and Terminals; Mobile radio interface Layer 3 specification; Core network protocols; Stage 3", 3rd Generation Partnership Project, 3GPP TS 24.008 V8.4.0, Dec. 2008.

ETSI, "Universal Mobile Telecommunications System (UMTS); LTE; Non-Access-Stratum (NAS) protocol for Evolved Packet System (EPS); Stage 3 (3GPP TS 24.301 version 11.7.0 Release 11)", ETSI TS 124 301 V11.7.0, Jul. 2013.

GSM Association, "LTE Roaming Guideline", GSMA IR.88, Version 9.0, Jan. 24, 2013.

* cited by examiner

METHOD AND APPARATUS FOR ROAMING RESTRICTIONS OF FORBIDDEN RADIO ACCESS NETWORKS IN A WIRELESS SYSTEM

RELATED APPLICATION

This application was originally filed as PCT Application No. PCT/IB2011/051629 filed Apr. 14, 2011.

TECHNICAL FIELD

The present application relates generally to roaming restrictions of forbidden radio access networks in a wireless system.

BACKGROUND

Mobile users have sometimes different access rights to different areas of a network. This may apply to users roaming within a network, such as a Home Public Land Mobile Network, HPLMN, or roaming outside of a network, such as to a visited Public Land Mobile Network, VPLMN. The network may be capable of controlling the behavior of each user individually, depending on the user's access rights to access certain parts or resources in the network.

Prior to using any network resources, a user needs to attach to a selected Public Land Mobile Network, PLMN, and to maintain the registration with the network. The user must perform updates based on time and mobility. Normally the selected PLMN acknowledges such attach and update requests, but sometimes there is a need to guide the user to an area that is allowed by subscription. This is done by sending a rejection message comprising a cause value indicating to the user why the request cannot be accepted.

SUMMARY

Various aspects of examples of the invention are set out in the claims.

According to a first aspect of the present invention, an apparatus comprising: at least one processor; and at least one memory including computer program code, wherein the at least one memory and the computer program code are configured to, with the at least one processor, cause the apparatus to perform at least the following: receive at least one of forbidden radio access technology code and indication that a radio access technology of a cell is forbidden, wherein the at least one of forbidden radio access technology code and indication indicates a radio access technology not allowed for access; store the received at least one of forbidden radio access technology code and indication in a forbidden list; and perform an attach, tracking area update or routing area update in a suitable cell if a suitable cell can be found within the same network not using the radio access technologies in the forbidden list; or perform a network re-selection if a suitable cell cannot be found within the same network.

According to a second aspect of the present invention, a method comprising: receiving at least one of forbidden radio access technology code and indication that a radio access technology of a cell is forbidden, wherein the at least one of forbidden radio access technology code and indication indicates a radio access technology not allowed for access; storing the received at least one of forbidden radio access technology code and indication in a forbidden list; and performing an attach, tracking area update or routing area update in a suitable cell if a suitable cell can be found within the same network not using the radio access technologies in the forbidden list; or performing a network re-selection if a suitable cell cannot be found within the same network.

According to a third aspect of the present invention, a computer program product comprising: a computer-readable medium bearing computer program code embodied therein for use with a computer, the computer program code comprising: code for receiving at least one of forbidden radio access technology code and indication that a radio access technology of a cell is forbidden, wherein the at least one of forbidden radio access technology code and indication indicates a radio access technology not allowed for access; code for storing the received at least one of forbidden radio access technology code and indication in a forbidden list; and code for performing an attach, tracking area update or routing area update in a suitable cell if a suitable cell can be found within the same network not using the radio access technologies in the forbidden list; or performing a network re-selection if a suitable cell cannot be found within the same network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 5 of the drawings.

Figure 1:
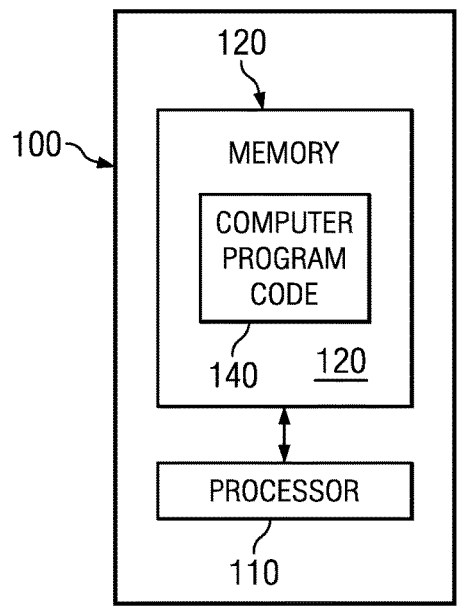
FIG. 1 is a block diagram depicting an electronic device operating in accordance with an example embodiment of the invention.

FIG. 1 is a block diagram depicting an electronic device 100 operating in accordance with an example embodiment of the invention. In an example embodiment, the electronic device 100 comprises a processor 110 or other processing component. In an example embodiment, the electronic device 100 may comprise multiple processors, such as processor 110.

In an embodiment, the electronic device 100 comprises memory 120. For example, the electronic device may comprise volatile memory, such as random access memory, RAM. Volatile memory may comprise a cache area for the temporary storage of data. Further, the electronic device 100 may also comprise non-volatile memory, which may be embedded and/or may be removable. The non-volatile memory may also comprise an electrically erasable programmable read only memory, flash memory, and/or the like. In an alternative embodiment, the processor 110 may comprise at least part of memory 120. For example, the processor 110 may comprise volatile memory, non-volatile memory, and/or the like.

The electronic device 100 may use at least one memory to store one or more computer program code 140. In accordance with computer program code 140, processor 110 may perform embodiments of the present invention, or cause electronic device 100 to perform embodiments of the invention.

The electronic device 100 may comprise a transmitter and a receiver. In an example embodiment, the transmitter and receiver are separated. In an alternative embodiment, the transmitter and receiver are combined. Where the receiver comprises a radio receiver, the receiver has a maximum radio frequency bandwidth it can receive data from. By maximum radio frequency bandwidth it is meant a maximum width of a frequency band comprising carriers and gaps between the carriers.

In an embodiment, the processor 110 of the electronic device 100 may comprise circuitry for implementing audio features, logic features, and/or the like. For example, the processor 110 may comprise a digital signal processor device, a microprocessor device, a processing core, a digital to analog converter, other support circuitry, and/or the like. In an embodiment, control and signal processing features of processor 110 may be allocated between devices, such as the devices describe above, according to their respective capabilities. Further, the processor 110 may also comprise an internal voice coder and/or an internal data modem. Further still, the processor 110 may comprise features to operate one or more software programs. For example, the processor 110 may be capable of operating a software program for connectivity, such as a conventional Internet browser. Further, the connectivity program may allow the electronic device 100 to transmit and receive Internet content, such as location-based content, other web page content, and/or the like. In an embodiment, the electronic device 100 may use a wireless application protocol, WAP, hypertext transfer protocol, HTTP, file transfer protocol, FTP, and/or the like to transmit and/or receive the Internet content.

In an embodiment, the electronic device 100 may be capable of operating in accordance with any of a number of a first generation communication protocol, a second generation communication protocol, a third generation communication protocol, a fourth generation communication protocol, and/or the like. For example, the electronic device 100 may be capable of operating in accordance with second generation, 2G, communication protocols IS-136, time division multiple access, TDMA, global system for mobile communication, GSM, IS-95 code division multiple access, CDMA, and/or the like. Further, the electronic device 100 may be capable of operating in accordance with third-generation, 3G, communication protocols, such as Universal Mobile Telecommunications System, UMTS, CDMA2000, wideband CDMA, WCDMA, time division-synchronous CDMA, TD-SCDMA, and/or the like. Further still, the electronic device 100 may also be capable of operating in accordance with 3.9 generation, 3.9G, wireless communication protocols, such as Evolved Universal Terrestrial Radio Access Network, E-UTRAN, or the like, or wireless communication projects, such as long term evolution, LTE, or the like. Still further, the electronic device 100 may be capable of operating in accordance with fourth generation, 4G communication protocols.

In an alternative embodiment, the electronic device 100 may be capable of operating in accordance with a non-cellular communication mechanism. For example, the electronic device 100 may be capable of communication in a wireless local area network, WLAN, other communication networks, and/or the like. Further, the electronic device 100 may communicate in accordance with techniques, such as radio frequency, RF, infrared, IrDA, any of a number of WLAN techniques. For example, the electronic device 100 may communicate using one or more of the following WLAN techniques: IEEE 802.11, e.g., 802.11a, 802.11b, 802.11g, 802.11n, and/or the like. Further, the electronic device 100 may also communicate, via a world interoperability, to use a microwave access, WiMAX technique, such as IEEE 802.16, and/or a wireless personal area network, WPAN technique, such as IEEE 802.15, BlueTooth, BT, ultra wideband, UWB, and/or the like. Electronic device 100 may be capable of communicating with both cellular and non-cellular radio access technologies. Electronic device 100 may be capable of communicating with both cellular and non-cellular radio access technologies simultaneously.

It should be understood that the communications protocols described above may employ the use of signals. In an example embodiment, the signals comprise signaling information in accordance with the air interface standard of the applicable cellular or non-cellular system, user speech, received data, user generated data, and/or the like. In an embodiment, the electronic device 100 may be capable of operating with one or more air interface standards, communication protocols, modulation types, access types, and/or the like. It should be further understood that the electronic device 100 is merely illustrative of one type of electronic device that would benefit from embodiments of the invention and, therefore, should not be taken to limit the scope of embodiments of the invention.

While embodiments of the electronic device 100 are illustrated and will be hereinafter described for purposes of example, other types of electronic devices, such as a portable digital assistant, PDA, a pager, a mobile television, a gaming device, a camera, a video recorder, an audio player, a video player, a radio, a mobile telephone, a traditional computer, a portable computer device, a global positioning system, GPS, device, a GPS navigation device, a GPS system, a mobile computer, a browsing device, an electronic book reader, a combination thereof, and/or the like, may be used. While several embodiments of the invention may be performed or used by the electronic device 100, embodiments may also be employed by a server, a service, a combination thereof, and/or the like.

Figure 2:
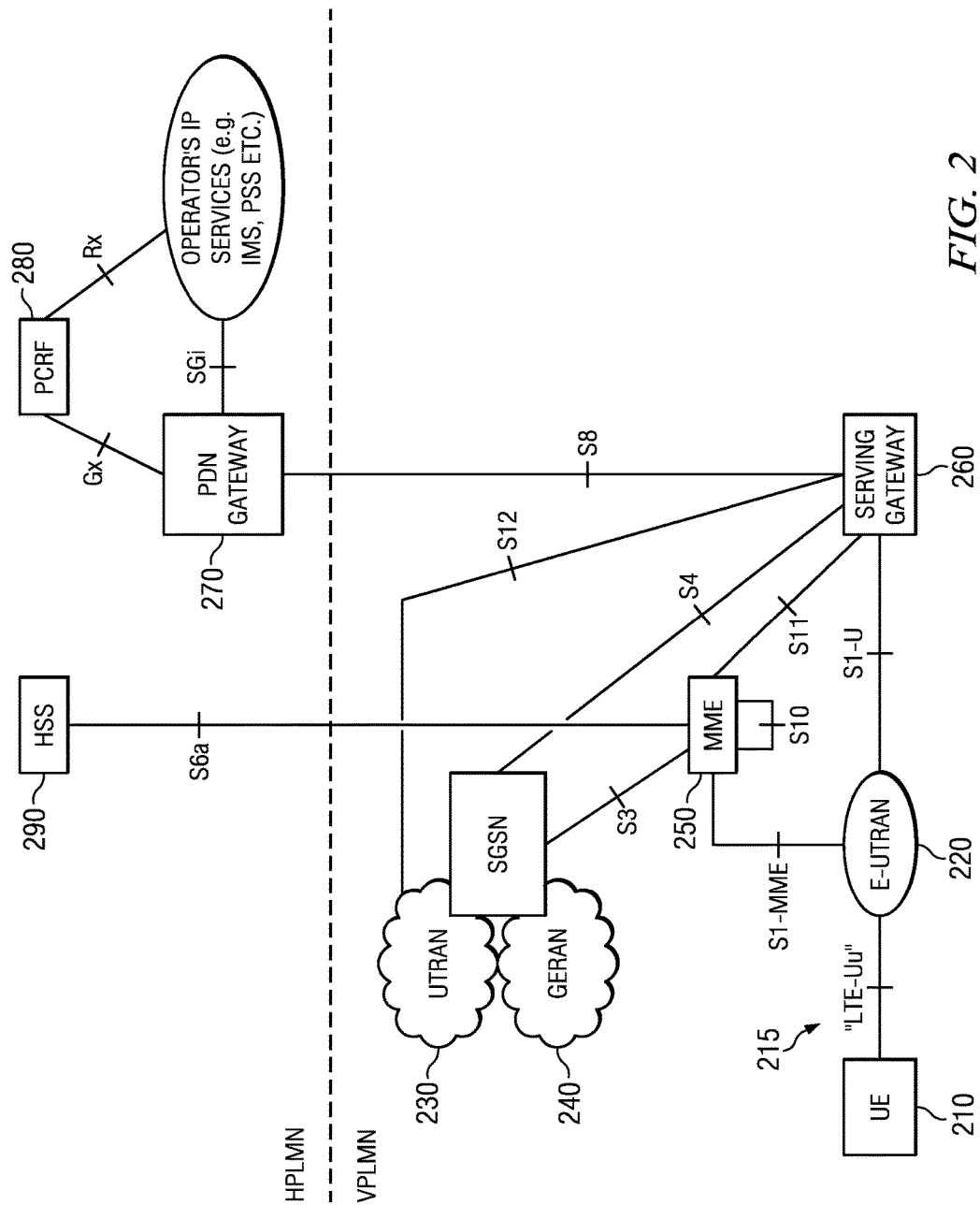
FIG. 2 illustrates an arrangement where some embodiments of the invention may be practiced.

FIG. 2 illustrates an arrangement where some embodiments of the invention may be practiced. FIG. 2 provides an example embodiment of roaming architecture for $3^{rd}$ generation partnership project, 3GPP, accesses. FIG. 2 illustrates apparatus 210. An example of apparatus 210 is an electronic device, such as electronic device 100 of FIG. 1.

Connection 215 allows apparatus 210 to transmit information to base station 220. Connection 215 may also allow apparatus 210 to receive information from base station 220. In an example embodiment, connection 215 may be a connection according to Long term evolution, LTE, and base station 220 is an evolved UMTS Terrestrial Radio Access Network, E-UTRAN, base station. In another example embodiment, connection 215 may be a connection according to wideband code division multiple access, WCDMA, and base station 230 is an UMTS Terrestrial Radio Access Network, UTRAN, base station. In yet another example embodiment, connection 215 may be a connection according to global system for mobile communications, GSM, and base station 240 is a GSM EDGE Radio Access Network, GERAN, base station. In a further example embodiment, connection 215 may be a connection according to other wireless technology. In some embodiments connection 215 may be a wire-line connection instead of a wireless connection. Connection 215 may comprise an uplink connection for conveying information from apparatus 210 to base station 220, 230 or 240. Connection 215 may comprise a downlink for conveying information from base station 220, 230 or 240 to apparatus 210. Base station 220, 230 or 240 comprises equipment configured to support connection 215, for example in embodiments where connection 215 is in accordance with LTE technology, base station 220 comprises at least equipment arranged to support LTE connections. Base station 220, 230 or 240 is herein referred to as a base station, but is should be understood that in some embodiments, other terms such as access point might be considered more accurate and such embodiments are not to be excluded from the scope of the present invention by this terminological choice.

The mobility management entity, MME, 250 of FIG. 2 is responsible handling mobility and security procedures such as network attach and tracking area updates, for example. The serving gateway 260 is responsible for routing and forwarding user packets. Serving gateway 260 may be configured to act as an anchor when apparatus 210 moves between 3GPP radio access technologies. The packet data network gateway, PDN gateway 270, connects to the serving gateway 260 and to at least one external packet data network such as an operator's IP services. PDN gateway 270 may be responsible for enforcing quality of service, QoS, and charging policies. The policy and charging rule function, PCRF, 280 is responsible for IP multimedia service, IMS, controlled QoS and charging. The home subscriber server, HSS, 290 is configured to store subscription profiles and security related parameters.

A relationship exists between apparatus 210 and its home Public Land Mobile Network, HPLMN. If communications are handled over another PLMN, this PLMN is referred to as the visited PLMN, VPLMN. FIG. 2 illustrates a roaming architecture from HPLMN to VPLMN. A PLMN is a network established and operated by an administration or by a recognized operating agency, ROA, for the specific purpose of providing land mobile communication services to the public. A PLMN provides communication possibilities for mobile users. For communications between mobile and fixed users, interworking with a fixed network is necessary. A PLMN may provide service in one, or a combination, of frequency bands. The PLMN area is the geographical area in which a PLMN provides communication services according to its specifications to mobile users. In the PLMN area, the mobile user can set up calls to a user of a terminating network. The terminating network may be a fixed network, the same PLMN, another PLMN or other type of PLMN. The PLMN area is allocated to a PLMN. It is determined by the service and network provider in accordance with any provisions laid down under national law.

Figure 3:
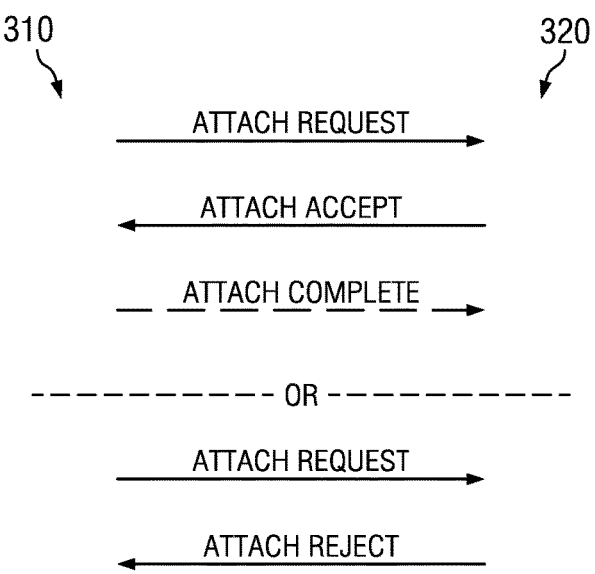
FIG. 3 is a flow chart illustrating an example method for performing attach in accordance with an example embodiment of the invention.

FIG. 3 is a flow chart illustrating an example method for performing attach in accordance with an example embodiment of the invention. In FIG. 3, an attach request may be sent from an apparatus 310, such as electronic device 100 of FIG. 1. The attach request is received by a network element 320, such as network element base station 220 and/or PLMN 230 of FIG. 2. If the attach request can be accepted by the network 320, the network sends attach accept message to apparatus 310. After receiving attach accept message, the apparatus 310 may optionally send an attach complete message to network 320. If the attach request cannot be accepted by the network 320, the network sends attach reject message to apparatus 310.

Figure 4:
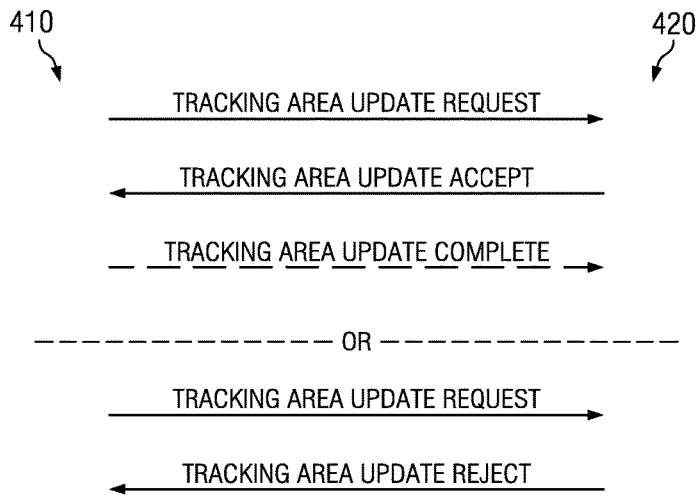
FIG. 4 is a flow chart illustrating an example method for performing tracking or routing area update in accordance with an example embodiment of the invention.

FIG. 4 is a flow chart illustrating an example method for performing tracking area or routing area update in accordance with an example embodiment of the invention. In FIG. 4, a tracking area or routing area request may be sent from an apparatus 410, such as electronic device 100 of FIG. 1. The tracking area or routing area update request is received by a network element 420, such as network element base station 220 and/or PLMN 230 of FIG. 2. If the attach request can be accepted by the network 420, the network sends a tracking area or routing area update accept message to apparatus 410. After receiving the tracking area or routing area update accept message, the apparatus 410 may optionally send a tracking area or routing area update complete message to network 420. If the tracking area or routing area update request cannot be accepted by the network 420, the network sends a tracking area or routing area update reject message to apparatus 410.

Figure 5:
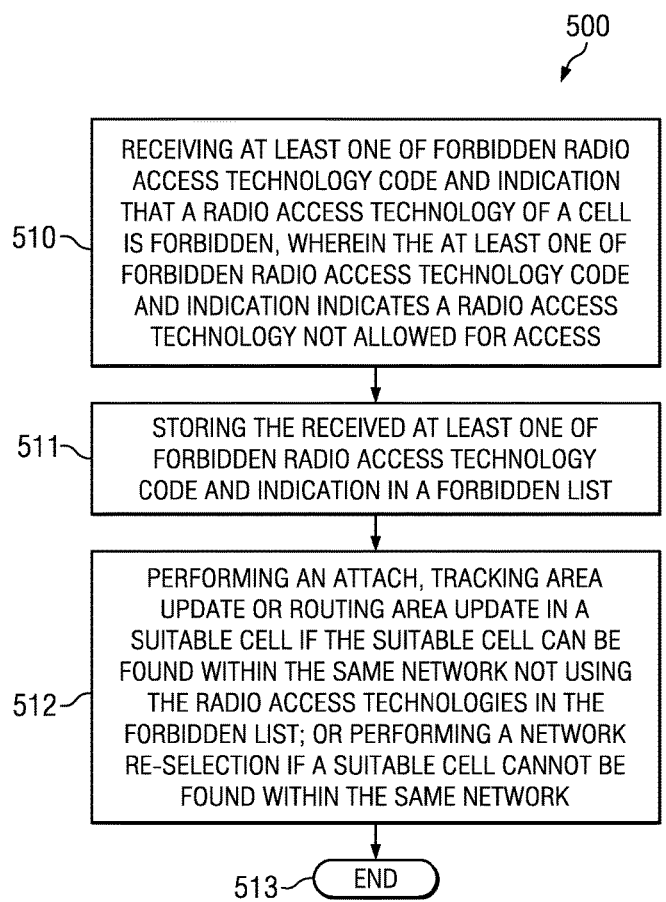
FIG. 5 is a flow diagram illustrating an example method for performing attach or update or re-selection with the forbidden access technology in accordance with an example embodiment of the invention.

FIG. 5 is a flow diagram illustrating an example method for performing attach or update or re-selection with forbidden access technology information in accordance with an example embodiment of the invention. Example method 500 may be performed by or in an apparatus, such as electronic device 100 of FIG. 1.

At block 510, the apparatus receives a forbidden radio access technology code or an indication that a radio access technology of a selected cell is forbidden, wherein the forbidden radio access technology code or the indication indicates a radio access technology not allowed for the apparatus to access. Receiving may comprise receiving a message, for example using a downlink. In an example embodiment the message may be an attach reject message, such as the attach reject message of FIG. 3. In the example embodiment, if an attach request cannot be accepted by the network, an attach reject message is sent to the apparatus. The forbidden radio access technology code or the indication may be a cause value for the rejection carried in the attach reject message. For example, a cause value #15 may be used to indicate to the apparatus a radio access technology is not allowed for it to access.

In another example embodiment, the message may be a tracking area or routing area update reject message, such as the tracking area or routing area update message of FIG. 4. In the example embodiment, if the tracking area or routing area updating cannot be accepted by the network, the network sends a tracking area or routing area update reject message to the apparatus. The forbidden radio access technology code or the indication may be a cause value for the rejection carried in the tracking area or routing area update reject message. For example, a cause value #15 may be used to indicate to the apparatus a radio access technology is not allowed for it to access. In general, any suitable method may be used to encode the identity of a forbidden radio access technology.

In some embodiments, the apparatus may be configured to obtain a list of at least one forbidden radio access technology in connection with attaching to a VPLMN. The VPLMN may be configured to derive a subscriber-specific list of forbidden radio access technologies based on subscriber information the VPLMN obtains from the subscriber's HPLMN and at least one agreement between the HPLMN and the VPLMN. In this case the list of forbidden radio access technologies may be comprised in an attach accept or tracking area update accept message, for example.

In an embodiment, the apparatus is configured to obtain a list of at least one forbidden radio access technology in connection with attaching to its HPLMN for the first time. In an embodiment a PLMN may broadcast a message to all apparatuses in its domain which causes the apparatuses to add a radio access technology to the forbidden list of all the apparatuses in the domain of the PLMN. This may be done to improve quality of service responsive to a radio access technology in the PLMN becoming unreliable or unstable. Where an apparatus receives a message instructing the apparatus to add a radio access technology presently in use to the forbidden list, the apparatus may responsively add the radio access technology to the forbidden list and initiate an inter-radio access technology handover away from the radio access technology.

At block 511, the apparatus stores the received forbidden radio access technology code or the indication in a forbidden list. The forbidden list may include codes or indications relating to all the radio access technologies not allowed for the apparatus to access. In an example embodiment, the apparatus may store the received forbidden radio access technology code or the indication until the PLMN is changed. In another example embodiment, the apparatus may store the received forbidden radio access technology code or the indication until the code or the indication becomes outdated. For example, the received forbidden radio access technology code or indication may become outdated when the apparatus receives more up to date information from the same PLMN. In some embodiments, the apparatus may maintain a timer, the received forbidden radio access technology code or the indication may be removed from the forbidden list when the timer expires. The timer value defining how long a radio access technology is to be considered as forbidden may be received in the same message as the code or indication relating to the forbidden radio access technology. In some embodiments, the received forbidden radio access technology code or the indication may be removed from the forbidden list when an explicit indication to remove a radio access technology from the forbidden list is received in signaling.

In an example embodiment when the forbidden list is valid, the apparatus may be prevented from sending signaling to the cells which use the stored forbidden radio access technologies.

At block 512, when the apparatus needs to perform attach or tracking area or routing area update, the apparatus performs attach or tracking area or routing area update in or to a suitable cell if a suitable cell can be found within the same public land mobile network not using the forbidden radio access technologies in the forbidden list; or the apparatus performs a public land mobile network re-selection to select another public land mobile network if a suitable cell cannot be found within the same public land mobile network.

The example method 500 ends at block 513.

Without in any way limiting the scope, interpretation, or application of the claims appearing below, a technical effect of one or more of the example embodiments disclosed herein may be enabling access of cells with non-forbidden radio access technologies within the same public land mobile network.

Embodiments of the present invention may be implemented in software, hardware, application logic or a combination of software, hardware and application logic. The software, application logic and/or hardware may reside on an electronic device or a personal key. If desired, part of the software, application logic and/or hardware may reside on an electronic device and part of the software, application logic and/or hardware may reside on a personal key. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device. A computer-readable medium may comprise a computer-readable storage medium, for example a non-transitory computer-readable storage medium, that may be any media or means that can contain or store the instructions for use by or in connection with an instruction execution system, apparatus, or device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
receiving, by a user equipment and from a network entity, at least one of an attach reject message and a tracking area update reject message, wherein the at least one of the attach reject message and the tracking area update reject message comprise an indication that a first radio access technology is not allowed for access by the user equipment in a first network, wherein the first radio access technology is E-UTRA;
storing, by the user equipment, the indication for the first network in a forbidden list, wherein the forbidden list includes one or more indications for networks in which access based on the first radio access technology is not allowed for access;
when a suitable cell from among cells within the first network is found not using the indicated first radio access technology, performing, by the user equipment, at least one of an attach, a tracking area update, and a routing area update to the suitable cell, the suitable cell using a second radio access technology different from the indicated first radio access technology on the forbidden list; and
when the suitable cell cannot be found within the cells of the first network, performing, by the user equipment, a network re-selection to another network other than the first network.

2. The method of claim 1, wherein the forbidden list is updated, when the first network is changed, a new forbidden radio access technology code is received from the first network, and/or another indication is received from the first network.

3. The method of claim 1, wherein one or more timers are utilized for each of the one or more indications for the networks in the forbidden list.

4. The method as in claim 1, wherein the indication includes a cause value comprising a value of 15.

5. The method as in claim 1, wherein the at least one of the attach reject message and the tracking area update reject message comprise a forbidden radio access technology code.

6. The method as in claim 1, wherein the second radio access technology comprises GERAN and/or UTRAN.

7. The method as in claim 1 further comprising:
preventing, when the indication for the first network is present in the forbidden list, the user equipment from sending signaling for the first radio access technology with the first network.

8. The method of claim 1, further comprising:
removing, by the user equipment, the indication for the first network from the forbidden list, when a timer for the indication for the first network expires.

9. An apparatus, comprising:
at least one processor; and
at least one memory including computer program code,
wherein the at least one memory and the computer program code are configured to, with the at least one processor, cause the apparatus to at least:
receive, from a network entity, at least one of an attach reject message and a tracking area update reject message, wherein the at least one of the attach reject message and the tracking area update reject message comprise an indication that a first radio access technology is not allowed for access by the user equipment in a first network, wherein the first radio access technology is E-UTRA;
store the indication for the first network in a forbidden list, wherein the forbidden list includes one or more indications for networks in which access based on the first radio access technology is not allowed for access;
when a suitable cell from among cells within the first network is found not using the indicated first radio access technology, perform at least one of an attach, a tracking area update, and a routing area update to the suitable cell, the suitable cell using a second radio access technology different from the indicated first radio access technology on the forbidden list; and
when the suitable cell cannot be found within the cells of the first network, perform a network re-selection to another network other than the first network.

10. The apparatus of claim 9, wherein the forbidden list is updated when the first network is changed, a new forbidden radio access technology code is received from the first network and/or another indication is received from the first network.

11. The apparatus of claim 9, wherein a network re-selection is performed, when at least one other cell in the same network cannot be found that does not use the at least one radio access technology in the forbidden list.

12. The apparatus as in claim 9, wherein the indication includes a cause value comprising a value of 15.

13. The apparatus as in claim 9, wherein the at least one of the attach reject message and the tracking area update reject message comprise a forbidden radio access technology code.

14. The apparatus as in claim 9, wherein the apparatus comprises and/or is comprised in a user equipment.

15. The apparatus as in claim 9, wherein the apparatus is further configured to at least:
prevent, when the indication for the first network is present in the forbidden list, the apparatus from sending signaling for the first radio access technology with the first network.

16. The apparatus of claim 9, wherein the apparatus is further caused to at least:
remove the indication for the first network from the forbidden list, when a timer for the indication for the first network expires.

17. A non-transitory computer-readable medium including program code which, when executed by at least one processor, causes operations comprising:
receiving, by a user equipment and from a network entity, at least one of an attach reject message and a tracking area update reject message, wherein the at least one of the attach reject message and the tracking area update reject message comprise an indication that a first radio access technology is not allowed for access by the user equipment in a first network, wherein the first radio access technology is E-UTRA;
storing, by the user equipment, the indication for the first network in a forbidden list, wherein the forbidden list includes one or more indications for networks in which access based on the first radio access technology is not allowed for access;
when a suitable cell from among cells within the first network is found not using the indicated first radio access technology, performing, by the user equipment, at least one of an attach, a tracking area update, and a routing area update to the suitable cell, the suitable cell using a second radio access technology different from the indicated first radio access technology on the forbidden list; and
when the suitable cell cannot be found within the cells of the first network, performing, by the user equipment, a network re-selection to another network other than the first network.

18. The non-transitory computer-readable medium of claim 17, wherein the forbidden list is updated when the first network is changed, a new forbidden radio access technology code is received from the first network and/or another indication is received from the first network.

* * * * *

UNITED STATES PATENT AND TRADEMARK OFFICE
CERTIFICATE OF CORRECTION

| | |
|---|---|
| PATENT NO. | : 10,757,670 B2 |
| APPLICATION NO. | : 14/110020 |
| DATED | : August 25, 2020 |
| INVENTOR(S) | : Hietalahti |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 227 days.

Signed and Sealed this
Twentieth Day of December, 2022

Katherine Kelly Vidal
*Director of the United States Patent and Trademark Office*